United States Patent
Soriano et al.

(10) Patent No.: US 10,399,692 B2
(45) Date of Patent: Sep. 3, 2019

(54) AIRCRAFT FUEL SYSTEM WITH HEATING OF STORED FUEL

(71) Applicants: Airbus Defence and Space GmbH, Taufkirchen (DE); Airbus Defence and Space SA, Madrid (ES)

(72) Inventors: Enrique Soriano, Donauwörth (DE); Sven Kopp, Höhenkirchen (DE); Winfried Lohmiller, Freising (DE); Christian Thiele, Garching (DE); Sergio Fernandez, Madrid (ES); Pablo Blazques, Alcorcon (ES)

(73) Assignees: AIRBUS DEFENCE AND SPACE GMBH, Taufkirchen (DE); AIRBUS DEFENCE AND SPACE SA, Madrid (ES)

( * ) Notice: Subject to any disclaimer, the term of this patent is extended or adjusted under 35 U.S.C. 154(b) by 179 days.

(21) Appl. No.: 15/101,786

(22) PCT Filed: Nov. 27, 2014

(86) PCT No.: PCT/EP2014/003167
§ 371 (c)(1),
(2) Date: Jun. 3, 2016

(87) PCT Pub. No.: WO2015/082057
PCT Pub. Date: Jun. 11, 2015

(65) Prior Publication Data
US 2016/0297538 A1    Oct. 13, 2016

(30) Foreign Application Priority Data
Dec. 3, 2013    (EP) ..................................... 13005615

(51) Int. Cl.
*B64D 37/34*    (2006.01)
*B64D 37/00*    (2006.01)
(Continued)

(52) U.S. Cl.
CPC ............. *B64D 37/34* (2013.01); *B64D 37/00* (2013.01); *B64D 37/04* (2013.01); *F02C 7/224* (2013.01);
(Continued)

(58) Field of Classification Search
CPC ........ B64D 37/34; B64D 37/04; B64D 37/00; B64D 37/02; F02C 7/224; F05D 2260/213; Y02T 50/676
See application file for complete search history.

(56) References Cited

U.S. PATENT DOCUMENTS 3,158,197 A * 11/1964 Blezard .................. B64D 13/00
165/104.31
3,779,007 A * 12/1973 Lavash ..................... F02C 7/14
60/241
(Continued)

OTHER PUBLICATIONS

European Patent Office, European Search Report for European Patent Application No. 13005615.3 dated Apr. 25, 2014.
(Continued)

*Primary Examiner* — Medhat Badawi
*Assistant Examiner* — Vicente Rodriguez
(74) *Attorney, Agent, or Firm* — Lorenz & Kopf LLP

(57) ABSTRACT

An aircraft fuel system comprises a fuselage tank and wing fuel tanks each connected to the fuselage fuel tank by a respective fuel line. A first fuel line connects the fuselage fuel tank to a collector fuel tank, which is connected by second fuel lines to aircraft engines in use of the system. Unspent fuel output from the aircraft engines is returned to the collector fuel tank via third fuel lines. A fuel line arrangement is arranged to draw fuel from, and return that fuel to, the wing fuel tanks. Fuel within the third fuel lines is thermally coupled to fuel within the fuel line arrangement by a heat exchanger. Heat energy within unspent fuel output from the aircraft engines is transferred to the wing fuel
(Continued)

Figure 1:
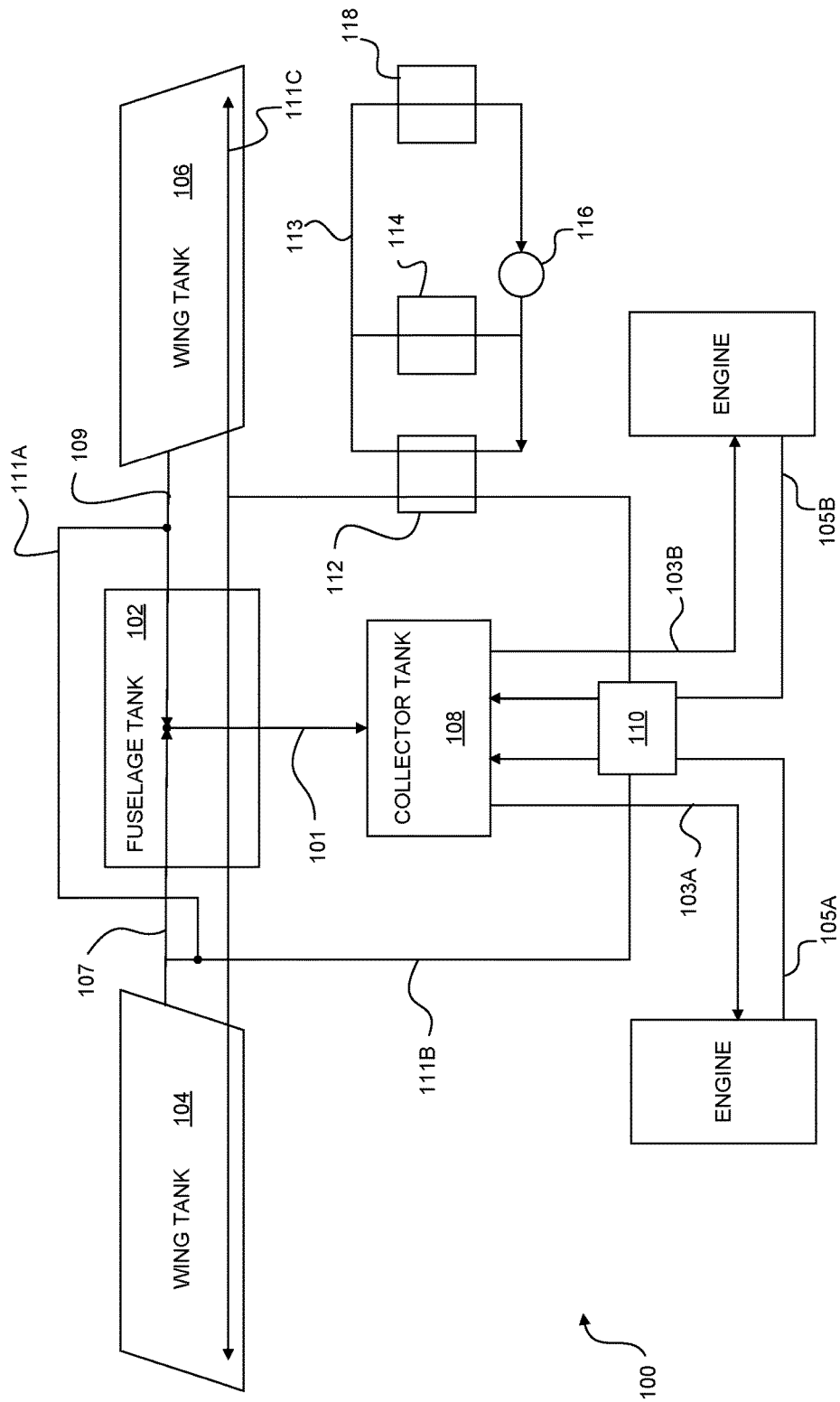

tanks, reducing the likelihood of fuel freezing within these tanks during extended flying in cold environments.

9 Claims, 2 Drawing Sheets

(51) Int. Cl.
    *F02C 7/224*       (2006.01)
    *B64D 37/04*     (2006.01)

(52) U.S. Cl.
    CPC ....... *F05D 2260/213* (2013.01); *Y02T 50/676* (2013.01)

(56) References Cited

U.S. PATENT DOCUMENTS

| | | | | |
|---|---|---|---|---|
| 4,505,124 A | * | 3/1985 | Mayer | B64D 37/34 |
| | | | | 123/553 |
| 4,705,100 A | * | 11/1987 | Black | F01D 25/18 |
| | | | | 123/553 |
| 4,776,536 A | * | 10/1988 | Hudson | B64D 37/34 |
| | | | | 244/117 A |
| 5,241,814 A | * | 9/1993 | Butler | F02C 7/14 |
| | | | | 60/39.08 |
| 2010/0313591 A1 | | 12/2010 | Lents et al. | |
| 2014/0345292 A1 | * | 11/2014 | Diaz | F02C 7/047 |
| | | | | 60/779 |
| 2015/0151845 A1 | * | 6/2015 | Jones | B64D 37/32 |
| | | | | 244/135 R |

OTHER PUBLICATIONS

European Patent Office, European Office Action for European Patent Application No. 13005615.3 dated May 20, 2016.
International Searching Authority, International Search Report for International Patent Application No. PCT/EP2014/003167 dated Nov. 2, 2015.

* cited by examiner

AIRCRAFT FUEL SYSTEM WITH HEATING OF STORED FUEL

CROSS-REFERENCE TO RELATED APPLICATION

This is a continuation of International Application No. PCT/EP2014/003167, filed Nov. 27, 2014, which application claims priority to European Application No. 13 005 615.3, filed Dec. 3, 2013, which are hereby incorporated by reference in their entirety.

TECHNICAL FIELD

The embodiments described herein relate to fuel systems for aircraft, particularly, although not exclusively, fixed-wing aircraft.

Aircraft flying for extended periods of time in low temperatures may be subject to freezing of fuel within fuel storage tanks. In very cold environments this can be a particular problem at lower altitudes as a result of the higher air pressure and air density that occur at lower altitudes, compared to higher altitudes, which leads to more rapid heat loss. In fixed-wing aircraft having fuel storage tanks integrated into the wings, fuel freezing within such tanks during extended flying in low temperatures is very likely. This is a particular problem where the wings have a low aspect ratio, due to the relatively high surface area of the wings in relation to fuel tank volume.

The present invention provides an aircraft fuel system characterised by a fuel storage tank arrangement, a collector fuel tank arrangement, a first fuel line connecting the fuel storage tank arrangement to the collector fuel tank arrangement and a second fuel line connecting the collector fuel tank arrangement to an aircraft engine in use of the system, wherein the system further comprises a first heat-transfer arrangement arranged to transfer heat energy within unspent fuel output from the aircraft engine to fuel within the fuel storage tank arrangement.

In use of a fuel system of the invention, heat energy within unspent fuel output by the aircraft engine is used to heat fuel within the fuel storage tank arrangement, instead of simply being wasted. This reduces the likelihood of fuel freezing within the fuel storage tank arrangement, without the need for dedicated heating and/or insulation apparatus.

In an example, the system further comprises a second heat-transfer arrangement arranged to transfer heat energy from aircraft electronic and/or computer equipment to fuel within the fuel storage tank arrangement. This provides additional heating of fuel within the fuel storage tank arrangement using further waste heat from aircraft electronic and/or computer equipment and further reduces the likelihood of fuel freezing within the fuel storage tank arrangement.

A third fuel line may connect the aircraft engine to the collector fuel tank arrangement in use of the system, whereby at least a portion of unspent fuel output by the aircraft engine is returned to the collector fuel tank arrangement, the first heat-transfer arrangement comprising: a fuel line arrangement arranged to draw fuel from, and return that fuel to, the fuel storage tank arrangement; and a heat-exchanger arranged to thermally couple fuel in the third fuel line to fuel in the fuel line arrangement.

This represents one convenient arrangement for transferring heat within unspent fuel to fuel in the fuel storage tank arrangement.

The fuel storage tank arrangement may comprise a fuselage fuel tank and a wing fuel tank connected by a fuel line, the first fuel line connecting the fuselage fuel tank to the collector tank arrangement, and the fuel line arrangement being arranged to draw fuel from, and return that fuel to, the wing fuel tank. In cases where the fuel storage tank arrangement comprises a wing fuel tank and a fuselage fuel tank, it is fuel in the wing fuel tank that is most susceptible to freezing because the limited space within an aircraft wing means that measures such as providing insulation may be difficult or impossible to apply.

In other embodiments, the first heat-transfer arrangement may comprise a third fuel line connecting the aircraft engine to the fuel storage tank arrangement in use of the system, whereby at least a portion of unspent fuel output by the aircraft engine is returned directly to the fuel storage tank arrangement. This is a particularly efficient arrangement for transferring heat within unspent fuel to the fuel storage tank arrangement because heat within unspent fuel is transferred to the fuel storage tank arrangement by movement of the unspent fuel itself. In these embodiments, in cases where the fuel storage tank arrangement comprises a fuselage fuel tank and a wing fuel tank connected by a fuel line, the first fuel line may connect the fuselage fuel tank to the collector fuel tank arrangement, the third fuel line connecting the aircraft engine to the wing fuel tank. Again, this allows heat within unspent fuel to be transferred to the wing fuel tank, rather to to the fuselage fuel tank, which is typically less likely to suffer from fuel freezing.

The second heat-transfer arrangement conveniently comprises a fuel line arrangement arranged to draw fuel from, and return that fuel to, the fuel storage tank arrangement and a heat-exchanger arranged to couple heat from the aircraft electronic and/or computer equipment to fuel within the fuel line arrangement.

In an example, the heat-exchanger is in thermal contact with a compressor arranged to compress a refrigerant fluid within a cooling circuit for cooling the aircraft electronic and/or computer equipment. This allows waste heat collected by the refrigerant to be efficiently coupled to the heat exchanger in addition to waste heat from the compressor itself.

In cases where the fuel storage tank arrangement comprises a fuselage fuel tank and a wing fuel tank connected by a fuel line, the first fuel line connects the fuselage fuel tank to the collector tank arrangement, the fuel line arrangement being arranged to draw fuel from, and return that fuel to, the wing fuel tank. Again, this provides for waste heat to be directed to the wing fuel tank which is more susceptible to fuel freezing.

In any embodiment, the collector fuel tank arrangement may be either a simplex collector tank or a duplex collector tank.

It should be understood that the phrase "fuel line" in this specification may indicate not only a single physical fuel line or fuel pipe, but possibly also a fuel route comprising two or more individual fuel lines or fuel pipes, including any appropriate valves, arranged in combination to transport fuel within the fuel system.

Embodiments of the invention are described below by way of example only and with reference to the accompanying drawings in which FIGS. 1 and 2 each schematically show a respective example aircraft fuel system of the invention.

Referring to FIG. 1, a fuel system 100 of the invention comprises a fuel storage tank arrangement comprising a fuselage fuel tank 102 and two wing fuel tanks 104, 106 each of which are connected to the fuselage fuel tank by a respective fuel line 107, 109. The fuselage fuel tank 102 is connected to a collector fuel tank 108 by a first fuel line 101. Fuel is provided to aircraft engines in use of the system 100 from the collector fuel tank 108 via second fuel lines 103A, 103B. Unspent fuel output from the aircraft engines is returned to the collector fuel tank 108 during operation of the system 100, via third fuel lines 105A, 105B which pass through a heat exchanger 110. A fuel line arrangement consisting of individual fuel lines 111A, 111B, 111C is arranged to draw fuel from the wing fuel tanks 104, 106 and to return that fuel to the wing tanks 104, 106. The fuel line 111B passes through the heat exchanger 110 which is arranged to couple heat from unspent fuel output by the aircraft engines within fuel lines 105A, 105B to fuel within the fuel line 111B. In other words fuel drawn from the wing fuel tanks 104, 106 is heated using heat within unspent fuel output by the aircraft engines, and then returned to the wing fuel tanks 104, 106, thus reducing the likelihood of fuel freezing within the wing fuel tanks 104, 106.

The system 100 further comprises a secondary heater exchanger 112 arranged to couple waste heat from aircraft electronic and/or computer equipment 118 to fuel within the fuel line 111B. Waste heat from the electronic and/or computer equipment 118 is conveyed to the secondary heat exchanger 112 via refrigerant within a cooling circuit 113. Heat within the refrigerant is coupled to the heat exchanger 112 upon compression within a compressor 116 which is in thermal contact with the heat exchanger 212. An air condenser 114 within the cooling circuit 113 provides a cold source to the electronic and/or computer equipment 118 in the event that fuel drawn from the wing tanks 104, 106 is very hot and/or there is little fuel in the wing tanks 104, 106 such that fuel within fuel line 111B cannot receive more heat.

In operation of the system 100, fuel drawn from the wing tanks 104, 106 is heated within fuel line 111B using waste heat within unspent fuel output from the aircraft engines, and also using waste heat from the aircraft electronic and/or computer equipment 118, and then returned to the wing fuel tanks 104, 106, thus reducing the likelihood of fuel freezing within these fuel tanks during extended flying in cold environments.

Figure 2:
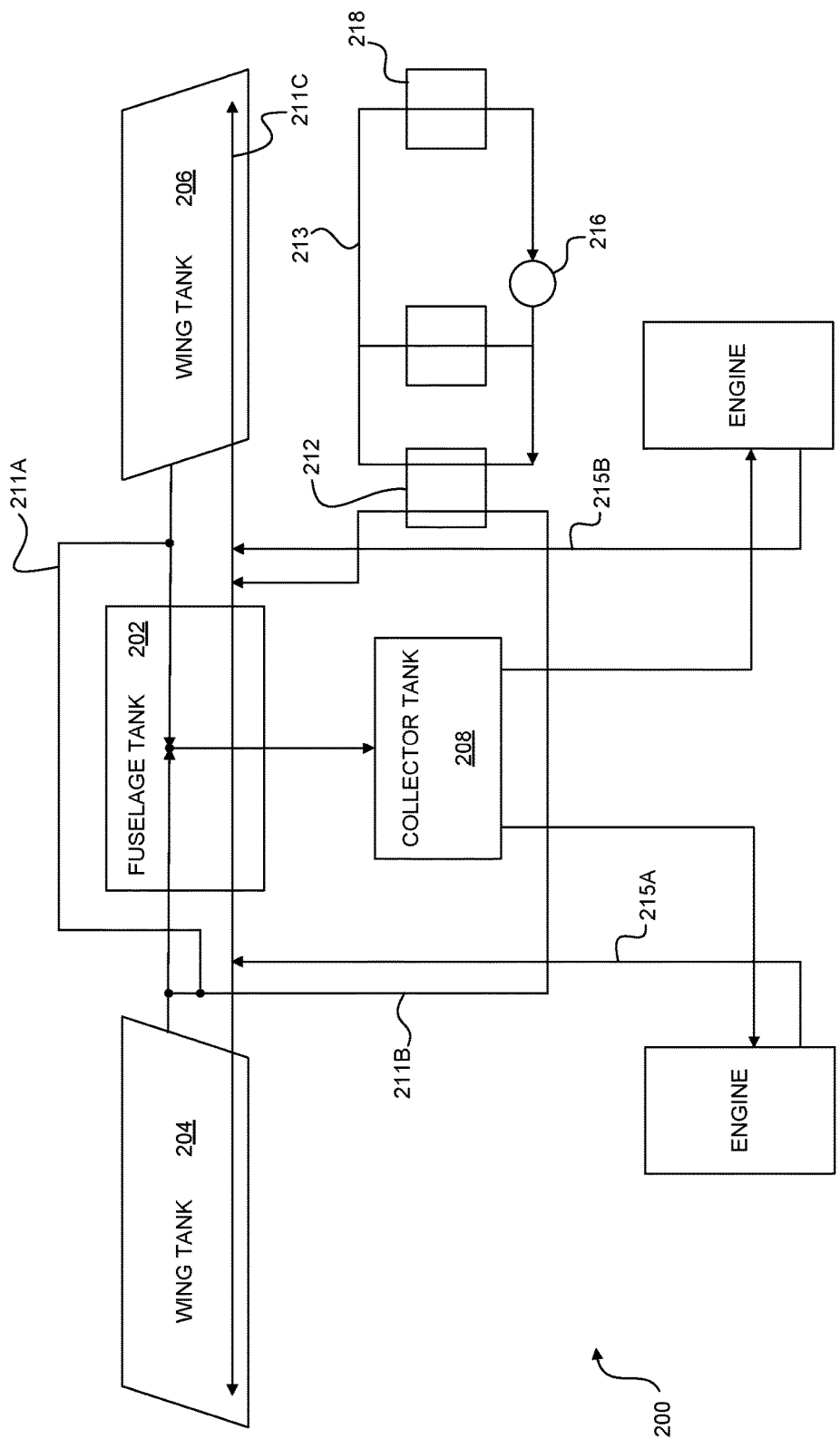

FIG. 2 shows a second example fuel system of the invention indicated generally by 200. In FIG. 2, parts corresponding to parts in the system 100 of FIG. 1 are given reference numerals corresponding to those labelling the equivalent parts in FIG. 1. A fuel line arrangement consisting of individual fuel lines 211A, 211B, 211C is arranged to draw fuel from wing fuel tanks 204, 206 and to return it to these tanks. Fuel line 211B passes through a heat exchanger 212 which couples waste heat from aircraft electronic and/or computer equipment 218 to fuel in fuel line 211B by a cooling circuit 213 comprising refrigerant fluid which is compressed by a compressor 216, the compressor 216 being in thermal contact with the heat exchanger 212.

The system 200 of FIG. 2 operates similarly to the system 100 of FIG. 1, except that unspent fuel output by the aircraft engines is returned directly to wing fuel tanks 204, 206, via fuel lines 215A, 215B, 211C, rather than being returned to the collector fuel tank 208. A heat exchanger for thermally coupling fuel within fuel lines 215A, 215B to fuel in fuel line 211B is not required, since waste heat within unspent fuel from the aircraft engines is transferred to the wing fuel tanks 204, 206 by directly returning the unspent fuel to these fuel tanks.

What is claimed is:
1. An aircraft fuel system, comprising:
a fuel storage tank arrangement,
a collector fuel tank arrangement,
a first fuel line connecting the fuel storage tank arrangement to the collector fuel tank arrangement, and
a second fuel line connecting the collector fuel tank arrangement to an aircraft engine in use of the aircraft fuel system,
wherein the aircraft fuel system further comprises a first heat-transfer arrangement arranged to transfer heat energy within unspent fuel output from the aircraft engine to fuel within the fuel storage tank arrangement,
wherein a third fuel line is provided that connects the aircraft engine to the collector fuel tank arrangement in use of the system, whereby at least a portion of unspent fuel output by the aircraft engine is returned to the collector fuel tank arrangement, and
wherein the first heat-transfer arrangement comprises:
a fuel line arrangement arranged to draw fuel from, and return that fuel to the fuel storage tank arrangement; and
a heat-exchanger is arranged to thermally couple fuel in the third fuel line to fuel in the fuel line arrangement.
2. The aircraft fuel system according to claim 1, further comprising a second heat-transfer arrangement arranged to transfer heat energy from aircraft electronic equipment to fuel within the fuel storage tank arrangement.
3. The aircraft fuel system according to claim 2, wherein the fuel storage tank arrangement comprises a fuselage fuel tank and a wing fuel tank connected by a fuel line, wherein:
the first fuel line connects the fuselage fuel tank to the collector tank arrangement; and
the fuel line arrangement is arranged to draw fuel from, and return that fuel to, the wing fuel tank.
4. The aircraft fuel system according to claim 2, wherein the second heat transfer arrangement comprises a fuel line arrangement arranged to draw fuel from, and return that fuel to, the fuel storage tank arrangement and a heat exchanger arranged to couple heat from the aircraft electronic equipment to fuel within the fuel line arrangement.
5. The aircraft fuel system according to claim 4, wherein the heat exchanger is in thermal contact with a compressor arranged to compress a refrigerant fluid within a cooling circuit for cooling the aircraft electronic equipment.
6. The aircraft fuel system according to claim 4, wherein the fuel storage tank arrangement comprises a fuselage fuel tank and a wing fuel tank connected by a fuel line, wherein:
the first fuel line connects the fuselage fuel tank to the collector tank arrangement; and
the fuel line arrangement is arranged to draw fuel from, and return that fuel to, the wing fuel tank.
7. An aircraft fuel system, comprising:
a fuel storage tank arrangement including a wing tank and a fuselage tank,
a collector fuel tank arrangement,
an aircraft engine,
a first fuel line connecting the fuel storage tank arrangement to the collector fuel tank arrangement,
a second fuel line connecting the collector fuel tank arrangement to the aircraft engine in use of the aircraft fuel system,
a third fuel line connecting the aircraft engine to the collector tank arrangement in use of the system, whereby at least a portion of unspent fuel output by the aircraft engine is returned to the collector fuel tank arrangement, a fuel line arrangement arranged to draw fuel from the fuel storage tank arrangement, heat the fuel in a recycle fuel line, and return the fuel to the fuel storage tank arrangement, and a heat-exchanger arranged to thermally couple the unspent fuel output by the aircraft engine in the third fuel line to the fuel in the recycle line, whereby cooled fuel is fed to the collector fuel tank arrangement by the third fuel line and heated fuel is fed to the fuel storage tank arrangement by the recycle fuel line.

8. The aircraft fuel system according to claim 7, wherein the first fuel line connects the fuselage tank to the collector fuel tank arrangement.

9. The aircraft fuel system according to claim 7, wherein the recycle line returns the heated fuel directly to the wing tank.

* * * * *